Patented June 5, 1951

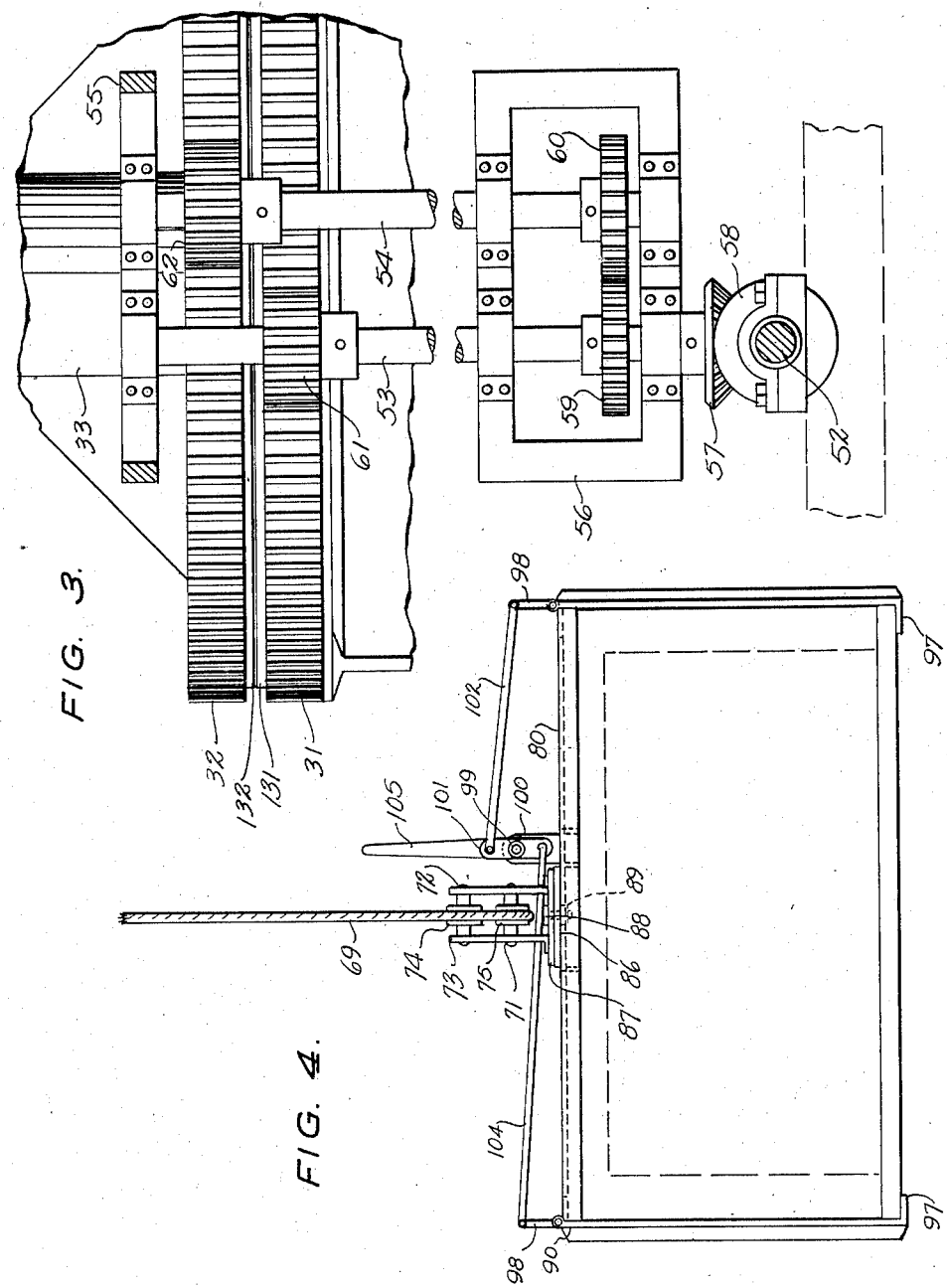

2,555,792

UNITED STATES PATENT OFFICE 2,555,792

LUMBER STACKING VEHICLE

Charles D. Farr, Memphis, Tenn.

Application January 24, 1950, Serial No. 140,172

7 Claims. (Cl. 212—49)

This invention relates to automotive vehicles equipped with power operated hoisting mechanism and more particularly to a vehicle for moving and stacking lumber in bundles.

It is among the objects of the invention to provide an improved lumber moving and stacking vehicle including a truck, a crane and a counterbalance pivotally mounted on the truck and means turning the crane and counterbalance in opposite directions so that the counterbalance is projected from the side of the truck opposite that at which the crane projects to effectively counterbalance a load carried by the crane, which utilizes a counterbalance which is disposed entirely on the truck when not in use and has a length such that it effectively counterbalances the load with a minimum amount of weight by using the maximum length lever arm consistent with the total length of the truck, which vehicle includes power operated mechanism for moving the crane and the counterbalance at substantially the same rate in opposite directions so that the projection of the counterbalance is always proportional to the projection of the crane and the counterbalance is automatically returned to its inoperative position in which it is disposed longitudinally of the truck when the crane is moved to a position longitudinal of the truck for movement of the truck, which vehicle provides a rack for supporting lumber clear of the crane and the counterbalance and a tong assembly operated by the crane for gripping and releasing bundles of lumber, and which is strong and durable in construction, simple and economical to manufacture, easy to operate, and not subject to malfunctioning in use.

Other objects and advantages will become apparent from a consideration of the following description and the appended claims in conjunction with the accompanying drawings, wherein:

Figure 3 is a partly broken away front elevational view of a gear train used to swing the crane and counterbalance of the vehicle; and, Figure 4 is a rear end view of a tong assembly for gripping and releasing bundles of lumber.

Figure 1:
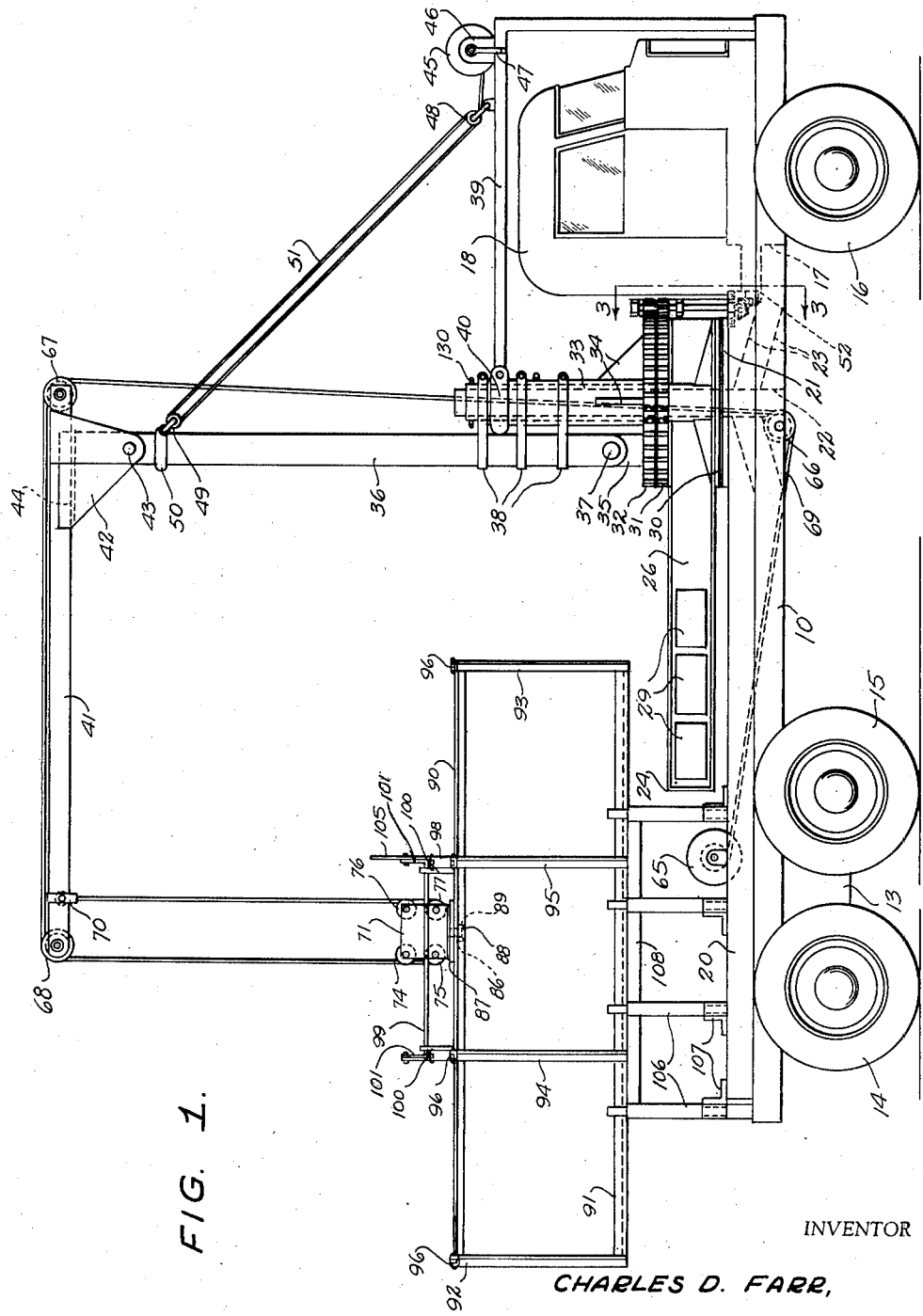
Figure 1 is a side elevational view of a vehicle illustrative of the invention.
Figure 2:
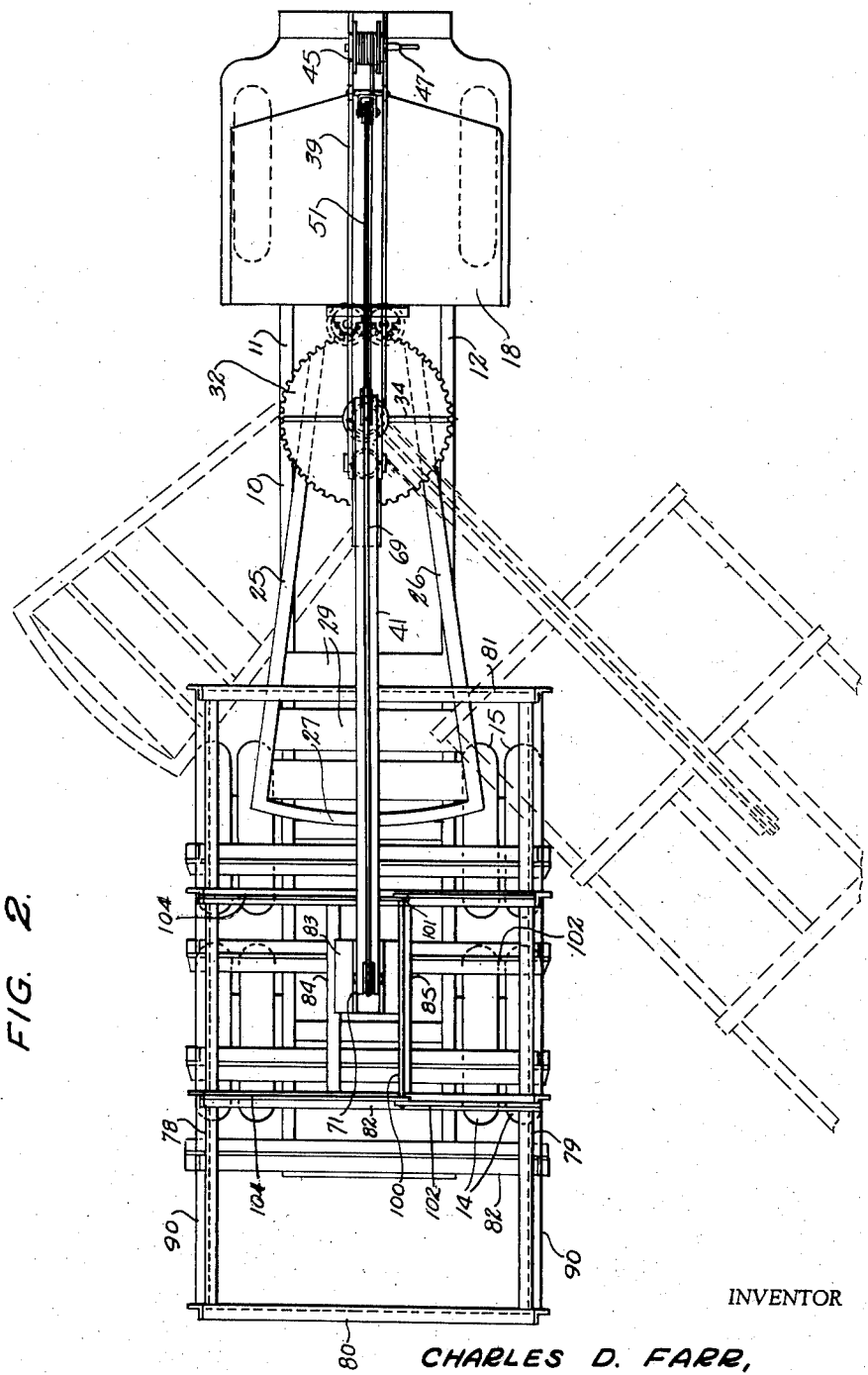
Figure 2 is a top plan view of the vehicle illustrated in Figure 1.

With continued reference to the drawings, the vehicle comprises an elongated frame or chassis 10 including two spaced apart, substantially parallel side members 11 and 12 and suitable cross members connected between the side members at spaced apart locations longitudinally of the latter, a rear wheel truck 13 supporting the rear end of the frame and carried by the rear wheels 14 and 15 and front wheels 16 supporting the front end of the frame by a suitable axle and spring suspension arrangement, not illustrated. An engine 17 is mounted on the frame near the front end of the latter and a driver's cab 18 is also mounted on the frame near the front end of the latter and may enclose the engine.

Suitable body rails 19 and 20 are supported on the frame side members 11 and 12 and extend longitudinally of the latter.

As the truck itself may be an existing truck of well known construction, a more detailed description thereof is considered unnecessary for the purposes of the present disclosure.

A circular platform 21 having a central aperture therein is mounted on the rails 19 and 20 adjacent the rear end of the engine and a tubular, cylindrical post 22 extends from the frame upwardly through the aperture in this platform, the post being secured at its lower end to the frame by suitable connectors 23.

An elongated counterbalance 24 is disposed slightly above the upper surface of the rails 19 and 20 and has near one end an aperture rotatably receiving the post 22.

This counterbalance is a frame structure having two elongated side members 25 and 26 which are spaced apart and substantially co-terminus and diverge slightly in a direction away from the end of the counterbalance receiving the post 22.

An arcuately curved end member 27 extends across the counterweight at the rear end of the counterweight remote from the post 22 and is connected at its opposite ends to the adjacent ends of the side members 25 and 26. A cross structure also connects the side members 25 and 26 at the front end of the counterbalance and the post receiving aperture is provided in this structure. Suitable weights 29 are carried by the counterbalance near the rear end thereof and the counterbalance has a length extending substantially from the rear end of the engine to the front end of the rear truck 13 of the vehicle.

A centrally apertured, circular turntable 30 is secured to the underside of the counterbalance 24 near the front end of the latter and a sleeve 130 is secured at its lower end to this turntable and receives the post 22. The turntable bears on the upper surface of the platform 21 to provide a support for the counterbalance and to permit the counterbalance to swing about the axis of its pivotal connection with the post 22 and the sleeve 130 extends upwardly to a location near the upper end of the post.

A large spur gear 31 is secured on the upper side of the counterbalance near the front end of the latter and is provided with a central aperture through which the post 22 extends. A face plate 131 is secured on the upper side of this gear and this face plate is apertured to receive the sleeve 130.

A second gear 32 of substantially the same size as the gear 31 is disposed above the face plate 131. This second gear is provided with a central aperture receiving the post 22 and sleeve 130, and also a third sleeve 33. A face plate 132 is secured on the lower side of gear 32 and is apertured to receive sleeve 130. This face plate bears upon the face plate 131 and provides a bearing for the gear 32. Sleeve 33 is secured at its lower end to face plate 132 and triangular gussets 34 reinforce the connection between the sleeve 33, the gear 32, and face plate 132.

An apertured lug 35 is secured on the upper side of the face plate 132 and extends upwardly through the gear 32 adjacent the sleeve 33 and a crane column 36 has at its lower end a formation providing a pair of spaced apart, apertured lugs which receive the lug 35 between them. The column 36 is pivotally connected to the lug 35 by a pivot or hinge pin 37 extending through registering apertures in the lug 35 and in the lug formations on the bottom end of the crane column.

The crane column is supported in upright position by suitable means, such as the hinged clamp bands 38, which surround the sleeve 33 and the column 36 in spaced apart relationship to each other and firmly connect the column to the sleeve.

The face plates 131 and 132 provide a bearing between the gears 31 and 32 for easy turning of the counterbalance relative to the crane column.

The sleeve is further reinforced by a brace structure 39 which extends from the front end of the frame 10 over the top of the cab 18 to the upper end of the sleeve 33 and is connected to the sleeve 33 by the hinged clamp band 40.

The crane column 36 may be conveniently formed from a length of steel tubing of the proper diameter and wall thickness and a crane boom 41 is pivotally connected near one end to the column 36 near the upper end of the latter.

The boom 41 may also be formed of a length of suitable steel tubing and a pair of spaced apart, substantially parallel gusset plates 42 extend from the boom near the end of the boom connected to the column 36 and receive the upper end portion of the column 36 between them. These plates are provided at a location spaced from the boom 41 with registering apertures and the column 36 is provided with an aperture registering with the apertures in the plates so that a pivot pin 43 can be inserted through the registering apertures in the plates 42 and the column 36 to pivotally connect the boom to the column. At its upper end the column 36 extends into a recess 44 in the boom and one end of this recess serves as a stop to firmly hold the boom in a condition in which it extends substantially perpendicularly from the upper end of the column 36, as illustrated in Figure 1. However, the boom may be swung about its pivotal connection with the column 36 to a position in which it extends substantially longitudinally from the upper end of the column. This is for the purpose of storing the boom and column on the vehicle frame rearwardly of the post 22 when the vehicle is being moved from one place to another and the crane is not being used.

When the bands 38 are released the column 36 can be raised and lowered and is raised and lowered by hand operated mechanism including a cable drum 45 mounted on the brace structure 39 near the front end of the latter by the brackets 46 and provided with a hand crank 47 by means of which it is manually rotated. A pulley block 48 is connected to the brace structure adjacent the drum 45 and a complementary pulley block 49 is connected to the column 36 near the upper end of the latter by a band 50 surrounding the column, the block 49 being connected to the clamp 50 by a hook so that it can be readily detached when desired. A cable 51 is wound at one end on the drum 45 and extends around the pulleys of the pulley blocks 48 and 49 to provide a block and tackle assembly by means of which the column 36 can be raised and lowered. When the column has been raised and secured in upright position by the clamp bands 38, the pulley block 49 is unhooked from the band 50 so that this column raising and lowering mechanism will not interfere with the operation of the crane.

A manually controlled power takeoff shaft 52 extends rearwardly from the engine 17 and this power takeoff shaft is connected to the gears 31 and 32 by gear mechanism particularly illustrated in Figure 3.

As illustrated in Figure 3, two spaced apart, substantially vertical shafts 53 and 54 are journaled at their upper ends in bearings carried by a bearing bracket 55 secured to a support extending upwardly from the frame at the rear end of the cab 18 and are journaled at their lower ends in spaced apart bearings carried in a bearing bracket 56 secured to the same support below the bearing bracket 55 and immediately above the power takeoff shaft 52.

The shaft 53 extends below the lower bearing bracket 56 and has a bevelled gear 57 on its lower end. A complementary bevelled gear 58 on the shaft 52 meshes with the gear 57 to drive the shaft 53 under manual control. The manual control provides not only for starting and stopping the shaft 52 but driving this shaft in either direction, as may be desired.

A spur gear 59 is secured on the shaft 53 within the bearing bracket 56 and a similar spur gear 60 is secured on the shaft 54 also within the bearing bracket 56 and meshes with the gear 59. Thus, when the shaft 53 is driven in one direction the shaft 54 will be driven in the opposite direction and at the same speed since the gears 59 and 60 are of the same size and have the same number of gear teeth.

A spur gear 61 secured on saft 53 meshes with the large gear 31 to drive the gear 31 when the shaft 53 is rotated and a spur gear 62 secured on shaft 54 meshes with the large gear 32 to drive the gear 32 in a direction opposite that in which the gear 31 is driven when the shaft 54 is driven by the shaft 53.

With this arrangement, the gear 32 may be driven to swing the crane outwardly from one side or the other of the vehicle frame and at the same time the gear 31 will be driven in the opposite direction to swing the counterbalance 24 outwardly from the other side of the frame to counterbalance a load carried by the crane.

The counterbalance 24 has a maximum length consistent with the total length of the vehicle so that, by using a lever arm of the maximum permissible length, a minimum amount of weight can be used to effectively counterbalance a load carried by the crane. Also since the movements of the crane and the counterbalance are simultaneous and oppositely coextensive the projection of the counterbalance from the frame will always be proportional to the extent to which the crane projects from the opposite side of the frame.

A cable drum 65 is rotatably mounted on the frame 10 rearwardly of the counterbalance 24 and transversely of the frame and is driven from another manually controlled power takeoff from the engine 17 by a suitable driving means, such as a chain and sprocket drive, not illustrated. A cable sheave 66 is journaled to the post 22 at the rear side of the lower end of the post, a cable sheave 67 is journaled on the crane boom 41 at the end of the boom adjacent the column 36 and a third cable sheave 68 is journaled on the boom 41 at the end of the boom remote from the column 36. A cable 69 is found at one end on the drum 65 and extends under the sheave 66, upwardly through the post 22, over the sheave 67, along the boom 41 and over the sheave 68 from which it depends. The opposite end of the cable is connected to the boom 41 adjacent the sheave 68, as indicated at 70, and the cable provides a depending loop at the end of the boom 41 remote from the crane column. A pulley block 71 is suspended from the boom 41 in the lower end of the cable loop and, as particularly illustrated in Figure 4, comprises two spaced apart, substantially parallel plates 72 and 73 and four pulleys 74, 75, 76 and 77 arranged with their axes at corresponding corners of a rectangle. This arrangement of the pulley block 71 is to restrain a tong assembly carried by the pulley block against excessive tilting while being suspended by the cable 69.

The tong structure comprises two spaced apart, substantially parallel longitudinal members 78 and 79 connected by end members 80 and 81 and intermediate, spaced apart cross members 82 and 83 to constitute a top frame. Two spaced apart battens 84 and 85 are connected between the intermediate cross members 82 and 83 adjacent the midlength locations of these cross members and a circular plate 86 is secured to these battens between the intermediate cross members.

The side members 72 and 73 of the pulley block 71 are flanged at their lower ends and secured to a circular plate 87 and a screw threaded bolt 88 extends from the center of the plate 87 downwardly through an aperture in the plate 86 and a nut 89 on to this bolt below the plate 86 secures the plates together and the tong assembly to the pulley block 71. The nut 89 is left sufficiently loose so that the plate 86 can turn freely relative to the plate 87 thus permitting the tong assembly to turn relatively to the pulley block 71 to facilitate moving bundles of lumber into narrow spaces.

Two side frame structures are provided and each side frame structure is hinged along its upper edge to the top frame structure along a corresponding side edge of the latter and depends therefrom. Each side frame structure comprises an upper longitudinal member 90, a lower longitudinal member 91 and four substantially vertical cross members including two end members 92 and 93 and two intermediate members 94 and 95, these cross members being spaced at substantially equal intervals lengthwise of the longitudinal members. Hinge connections between the upper edges of the side frame structure and the top frame structure are indicated at 96 and the vertical cross members have their lower ends inwardly offset, as indicated at 97, to fit under cross strips on which lumber is piled for lifting a bundle of lumber. The intermediate cross members 94 and 95 extend above the upper longitudinal members 90, as indicated at 98, for a purpose which will presently appear.

A shaft 99 extends longitudinally above the tong assembly and is supported on the cross members by suitable apertured brackets 100. Cranks 101 are secured on this shaft at spaced apart locations therealong and the intermediate side frame members 94 and 95 projecting above the longitudinal side members 90 of the tong assembly at opposite sides of the tong assembly are secured to these cranks at respectively opposite ends of the cranks by suitable links as indicated at 102 and 104. A hand lever 105 is secured at one end to the shaft 99 near one end of the latter and projects upwardly from the shaft.

With this arrangement, when the hand lever 105 is moved in one direction the side frame structures of the tong assembly will be swung outwardly to release a bundle of lumber secured in the tong assembly and when the hand lever is moved in the opposite direction the side frame structure will be swung inwardly to engage a bundle of lumber which has been disposed between the side frame structure by lowering the tong assembly over such bundle of lumber.

A rack is provided on the vehicle frame 10 near the rear end of the frame to support the bundles of lumber clear of the counterbalance 24 and the crane. This rack may conveniently comprise a plurality of stakes 106 which extend upwardly in spaced apart relation to each other from the outer ends of cross members 107 carried on the upper edges of the body rails 19 and 20, longitudinal side members, one of which is indicated at 108 in Figure 1, secured to the stakes 106 at their upper ends, and cross members not illustrated which extend between and maintain the side members in spaced apart, substantially parallel relationship and support the weight of the bundles of lumber carried by the rack, as particularly illustrated in Figure 1.

In using the vehicle to move and stack lumber, the tong assembly may be engaged with a bundle of green lumber and this bundle raised by the crane and power operated cable drum 65 and placed on the lumber carrying rack. The vehicle may then be driven to a location at which the lumber is to be stacked, which location may be between two adjoining stacks of lumber. With the vehicle located so that the rear end of the bundle of lumber carried thereon is near the side of the opening adjacent the front end of the vehicle, the bundle is raised by the crane and the crane is then swung outwardly toward the opening into which the lumber is to be placed, the vehicle being simultaneously backed so that the bundle of lumber will be moved straight into the opening as the crane swings. As the crane swings out from one side of the vehicle the counterbalance swings out from the opposite side, in the manner explained above, to effectively counter balance the bundle of lumber carried by the crane. When the bundle of lumber has been moved to the proper location, it is lowered and the tong assembly is released by proper operation of the hand lever 105 whereupon the tong assembly may be withdrawn from the opening by a reversal of the above described procedure and the vehicle moved to pick up a new load of green lumber.

This invention may be embodied in other spe-

What is claimed is:

1. A vehicle assembly comprising a wheel supported frame having a front end and a rear end, an engine mounted on said frame at the front end of the latter, a centrally apertured platform mounted on said frame adjacent the rear end of said engine, a load supporting rack on said frame and spaced rearwardly from said platform, a cylindrical post extending from said frame upwardly through the aperture in said platform, a counterbalance supported at the upper side of said frame and having near one end an aperture receiving said post, said counterbalance having a length only slightly less than the distance from the rear end of said engine to the front end of said rack, a turntable secured to the under side of said counterbalance coaxially with said post and bearing on said platform, a first gear secured on the upper side of said counterbalance coaxial with said post, a second gear bearing on said first gear and having a central aperture receiving said post, a sleeve receiving said post above said second gear and secured at its lower end to said second gear, a crane column hingedly secured at its lower end to said second gear adjacent said sleeve, means connecting said crane column and said sleeve supporting said column in upright position, brace means extending from the front end of said frame to the upper end of said sleeve, a crane boom secured at one end to said column at the upper end of the latter and extending substantially perpendicularly therefrom, manually controlled gear means connecting said engine with said first and second gears for driving said first and second gears in respectively opposite directions to swing the crane boom outwardly of one side of said frame and simultaneously swing said counterbalance outwardly of the other side of said frame, a power operated cable drum mounted on said frame, a cable extending from said drum along said column and said boom, and a pulley block suspended by said cable from the end of said boom remote from said column.

2. A vehicle assembly comprising a wheel supported frame having a front end and a rear end, an engine mounted on said frame at the front end of the latter, a centrally apertured platform mounted on said frame adjacent the rear end of said engine, a load supporting rack on said frame and spaced rearwardly from said platform, a cylindrical post extending from said frame upwardly through the aperture in said platform, a counterbalance supported at the upper side of said frame and having near one end an aperture receiving said post, said counterbalance having a length only slightly less than the distance from the rear end of said engine to the front end of said rack, a turntable secured to the under side of said counterbalance coaxially with said post and bearing on said platform, a first gear secured on the upper side of said counterbalance coaxial with said post, a second gear bearing on said first gear and having a central aperture receiving said post, a sleeve receiving said post above said second gear and secured at its lower end to said second gear, a crane column hingedly secured at its lower end to said second gear adjacent said sleeve, means connecting said crane column and said sleeve supporting said column in upright position, brace means extending from the front end of said frame to the upper end of said sleeve, a crane boom secured at one end to said column at the upper end of the latter and extending substantially perpendicularly therefrom, manually controlled gear means connecting said engine with said first and second gears for driving said first and second gears in respectively opposite directions to swing the crane boom outwardly of one side of said frame and simultaneously swing said counterbalance outwardly of the other side of said frame, a power operated cable drum mounted on said frame, a cable extending from said drum along said column and said boom, a pulley block suspended by said cable from the end of said boom remote from said column, and a manually operated block and tackle assembly connected between said brace means and said column near the upper end of the latter for raising and lowering said crane boom.

3. A vehicle assembly comprising a wheel supported frame having a front end and a rear end, an engine mounted on said frame at the front end of the latter, a centrally apertured platform mounted on said frame adjacent the rear end of said engine, a load supporting rack on said frame and spaced rearwardly from said platform, a cylindrical post extending from said frame upwardly through the aperture in said platform, a counterbalance supported at the upper side of said frame and having near one end an aperture receiving said post, said counterbalance having a length only slightly less than the distance from the rear end of said engine to the front end of said rack, a turntable secured to the under side of said counterbalance coaxially with said post and bearing on said platform, a first gear secured on the upper side of said counterbalance coaxial with said post, a second gear bearing on said first gear and having a central aperture receiving said post, a sleeve receiving said post above said second gear and secured at its lower end to said second gear, a crane column hingedly secured at its lower end to said second gear adjacent said sleeve, means connecting said crane column and said sleeve supporting said column in upright position, brace means extending from the front end of said frame to the upper end of said sleeve, a crane boom secured at one end to said column at the upper end of the latter and extending substantially perpendicularly therefrom, manually controlled gear means connecting said engine with said first and second gears for driving said first and second gears in respectively opposite directions to swing the crane boom outwardly of one side of said frame and simultaneously swing said counterbalance outwardly of the other side of said frame, a power operated cable drum mounted on said frame, a cable extending from said drum along said column and said boom, a pulley block suspended by said cable from the end of said boom remote from said column, and a tong assembly connected to said pulley block for engaging and releasing bundles of lumber handled by the vehicle.

4. A vehicle assembly comprising a wheel supported frame having a front end and a rear end, an engine mounted on said frame near the front end of the latter, an elongated counterbalance pivotally secured at one end to said frame adjacent the rear end of said engine for swinging movement laterally of said frame, a crane column disposed above said frame and extending upwardly therefrom adjacent the rear end of said engine, means supporting said column at one end on said frame for turning and swinging movements of the column relative to the frame, a crane boom secured near one end to said crane column near the upper end of the latter and extending outwardly from said column for swinging movement laterally of said frame, and manually controlled gear means drivingly connecting said engine to said counterbalance and said crane column for swinging said counterbalance and said crane boom laterally of said frame, said gear means including reversing gear mechanism to simultaneously swing said counterbalance and said crane boom in respectively opposite directions.

5. A vehicle assembly comprising a wheel supported frame having a front end and a rear end, an engine mounted on said frame near the front end of the latter, an elongated counterbalance pivotally secured at one end to said frame adjacent the rear end of said engine for swinging movement laterally of said frame, a crane column disposed above said frame and extending upwardly therefrom adjacent the rear end of said engine, means supporting said column at one end on said frame for turning movements of the column relative to the frame, a crane boom secured near one end to said crane column near the upper end of the latter and extending outwardly from said column for swinging movement laterally of said frame, manually controlled gear means drivingly connecting said engine to said counterbalance and said crane column for swinging said counterbalance and said crane boom laterally of said frame, said gear means including reversing gear mechanism to simultaneously swing said counterbalance and said crane boom in respectively opposite directions, and a rack mounted on said frame at the rear end of said counterbalance to support a load on said frame clear of said counterbalance.

6. A vehicle assembly comprising a wheel supported frame having a front end and a rear end, an engine mounted on said frame, an elongated counterbalance mounted on said frame, means providing a pivotal connection between the front end of said counterbalance and said frame near the front end of the latter, a crane column disposed above said means and extending upwardly therefrom, means supporting said crane column at one end on the first mentioned means for turning movements about the axis of said pivotal connection, gear means connected between said engine, said counterbalance and said crane column for turning said counterbalance and said crane column in relatively opposite directions about the axis of said pivotal connection by operation of said engine, and a crane boom pivotally connected at one end to said crane column at the upper end of the latter.

7. A vehicle assembly comprising a wheel supported frame having a front end and a rear end, an engine mounted on said frame, an elongated counterbalance mounted on said frame, means providing a pivotal connection between the front end of said counterbalance and said frame near the front end of the latter, a crane column disposed above said means and extending upwardly therefrom, means supporting said crane column at one end on the first mentioned means for turning movement about the axis of said pivotal connection, gear means connected between said engine, said counterbalance and said crane column for turning said counterbalance and said crane column in relatively opposite directions about the axis of said pivotal connection by operation of said engine, a crane boom pivotally connected at one end to said crane column at the upper end of the latter, an engine driven winch supported on said frame, and a cable wound at one end on said winch and carried over the upper end of said column to said boom.

CHARLES D. FARR.

No references cited.